(12) United States Patent
Heumoos et al.

(10) Patent No.: US 11,869,713 B2
(45) Date of Patent: Jan. 9, 2024

(54) PREVENTIVE FUNCTION CONTROL IN AN ELECTROMAGNETIC SPRING PRESSURE BRAKE

(71) Applicant: Chr. Mayr GmbH + Co. KG, Mauerstetten (DE)

(72) Inventors: Harald Heumoos, Dietmannsried (DE); Matthias Kramkowski, Steingaden (DE); Andreas Marten, Baisweil (DE); Frank Timmler, Wiedergeltingen (DE); Karl Unsin, Beckstetten (DE)

(73) Assignee: Chr. Mayr GmbH + Co. KG, Mauerstetten (DE)

( * ) Notice: Subject to any disclaimer, the term of this patent is extended or adjusted under 35 U.S.C. 154(b) by 267 days.

(21) Appl. No.: 17/276,702

(22) PCT Filed: Sep. 27, 2019

(86) PCT No.: PCT/EP2019/076224
§ 371 (c)(1),
(2) Date: Mar. 16, 2021

(87) PCT Pub. No.: WO2020/070010
PCT Pub. Date: Apr. 9, 2020

(65) Prior Publication Data
US 2022/0025945 A1 Jan. 27, 2022

(30) Foreign Application Priority Data
Oct. 5, 2018 (EP) ..................................... 18198832

(51) Int. Cl.
*F16D 66/00* (2006.01)
*H01F 7/18* (2006.01)
(Continued)

(52) U.S. Cl.
CPC ............ *H01F 7/1844* (2013.01); *B60T 17/22* (2013.01); *F16D 2121/22* (2013.01)

(58) Field of Classification Search
CPC .... H01F 7/1844; B60T 17/22; F16D 2121/22; F16D 2121/18; F16D 2121/20;
(Continued)

(56) References Cited

U.S. PATENT DOCUMENTS 3,741,353 A * 6/1973 McKinley ............... F16D 55/02
192/18 B
4,717,865 A * 1/1988 Caputo ................... F16D 55/00
318/362
(Continued)

FOREIGN PATENT DOCUMENTS

DE 10314390 B4 11/2012
DE 10211075935 B4 11/2012
(Continued)

OTHER PUBLICATIONS

International Search Report and Written Opinion prepared by the European Patent Office for PCT/EP2019/076224, dated Jan. 14, 2020, 11 pages.
(Continued)

*Primary Examiner* — Nicholas J Lane
*Assistant Examiner* — Stephen M Bowes
(74) *Attorney, Agent, or Firm* — Chernoff, Vilhauer, McClung & Stenzel, LLP

(57) ABSTRACT

Preventative function control in electromagnetic spring pressure brakes is disclosed. Initially, the spring pressure brake is controlled by voltage. Next, state variables current and voltage are measured. Subsequently, a determination variable is determined and summed over a first range, which extends from a starting point of actuation to a point at which an armature disk begins to move. At the point, current value
(Continued)

is detected at which movement of the armature disk begins. The determination variable is summed over a second range, which extends from the starting point, when the current reaches the value detected above, up to a constant current. Subsequently, a ratio is calculated from the sum of the determination variable over the range to the sum of the determination variable over the first and second ranges. Upon reaching a predetermined value by the value of the ratio, a state signal is output.

14 Claims, 5 Drawing Sheets

(51) Int. Cl.
*B60T 17/22* (2006.01)
*F16D 121/22* (2012.01)

(58) Field of Classification Search
CPC ........ F16D 65/18; F16D 66/00; F16D 66/003; F16D 66/005; F16D 27/06; F16D 59/02; F16D 2055/0058; F16D 55/28; F16D 2129/065; H02K 33/18; H02K 7/104; H02K 7/106; F02M 47/027
See application file for complete search history.

(56) References Cited

U.S. PATENT DOCUMENTS

| | | | |
|---|---|---|---|
| 5,153,389 A * | 10/1992 | Nomura | B66D 5/30 187/351 |
| 2003/0061872 A1 | 4/2003 | Giessler | |
| 2009/0223755 A1* | 9/2009 | Giering | F16D 65/18 188/156 |
| 2015/0252861 A1* | 9/2015 | Jantunen | G01L 5/28 324/537 |
| 2017/0211640 A1* | 7/2017 | Pearce | H02P 29/04 |
| 2019/0226537 A1* | 7/2019 | Unsin | F16D 55/16 |

FOREIGN PATENT DOCUMENTS

| | | | |
|---|---|---|---|
| DE | 102016119027 A1 * | 4/2018 | ............. B60T 13/04 |
| JP | 6382366 B2 | 8/2018 | |
| WO | 2009/024168 A1 | 2/2009 | |

OTHER PUBLICATIONS

English Translation of the International Preliminary Report on Patentability prepared by the European Patent Office for PCT/EP2019/067224, dated Mar. 23, 2021, 7 pages.

* cited by examiner

PREVENTIVE FUNCTION CONTROL IN AN ELECTROMAGNETIC SPRING PRESSURE BRAKE

The present invention relates to a method for preventive function control in an electromagnetic spring-loaded brake.

Such methods are preferably used in the field of elevator, stage and lifting technology.

DE 103 14 390 B4 discloses a method and device for monitoring an electromagnetically actuated brake with a coil generating a magnetic field and an armature disk which is movably arranged by the magnetic field, in which the magnetic field is generated by applying a coil current to the coil and movement of the armature disk is determined by monitoring the timing of the coil current, wherein a switch-on point is determined from the timing of the coil current and is representative of the start of movement of the armature disk. At the switch-on point, the coil current is compared with a predetermined first threshold which is representative of a predetermined first wear state of the brake, and based on the result of this comparison a signal representative of the current wear state of the brake is output.

DE 10 2011 075 935 B4 discloses a method for determining error states of an electromagnetic actuator, the functional state and/or the error state based on a comparison of at least one magnetic reference characteristic, which describes a linked magnetic target flux as a function of a current intensity, and a magnetic actual characteristic curve, which describes a linked magnetic actual flux as a function of the current intensity. The linked actual magnetic flux of a current and a voltage measurement in the generating circuit of the magnetic field is determined during operation of the electromagnetic actuator. In addition, a generic or batch-specific magnetic characteristic curve for the electromagnetic actuator is determined, which is adapted to the specific individual properties of the electromagnetic actuator by means of a calibration in order to determine the magnetic reference characteristic curve. To determine the linked magnetic target flux of an individual electromagnetic actuator, a functional, generic-specific electromagnetic actuator is first selected and, in a later process step, the batch-specific behaviour is adapted to measured values that are measured on the electromagnetic actuators actually used, with averaging. Individual electromagnetic or mechanical properties of the electromagnetic actuator are thereby incorporated into the magnetic reference characteristic.

The object of the present invention, by contract, is to provide a simpler alternative method for a more precise preventive functional control of a spring-loaded brake.

This object is achieved according to the invention in that an electromagnetic spring-loaded brake, which comprises at least one coil, as well as an armature disk, a coil carrier with compression springs distributed thereon, a control module, and a monitoring module with at least one semiconductor component, a current measuring device, and a voltage measuring device, runs through the following method steps. Initially, the spring-loaded brake is controlled with a voltage by the control module. The monitoring module then measures the state variables current (I) and voltage (U) at the electromagnetic spring-loaded brake. During the further course, a parameter (T; F) of the electromagnetic spring-applied brake is determined by the monitoring module. This parameter (T; F) is summed over a range (a) which extends from the starting point of the control (12) to a point (W) at which the armature disk begins to move. At point (W) a current value is recorded at which the armature disk begins to move. Furthermore, the parameter (T; F) is also summed over a range (b) which extends from the point of activation, when the current (I) again reaches the value recited above, to the point at which a constant current is achieved. In the further course, a ratio (X) is calculated from the sum of the parameter over the area (a) to the sum of the parameter over the area (a) and (b). When a predetermined value (Y) is reached or exceeded by the value of the ratio (X), a status signal relating to a critical operating status of the spring-loaded brake is output.

In a preferred embodiment, the parameter (T) is time. In an alternative embodiment, the parameter (F) is the linked flux.

In a preferred embodiment, the point (W) at which the armature disk begins to move is determined by the following method steps. Firstly, the state variables current (I) and/or voltage (U) on the electromagnetic spring-loaded brake are measured by the monitoring module. Following this, a further state variable is determined from the measured state variable current (I), voltage (U) and from the resistance value of the coil (Rs) or is calculated from a variable derived from the measured state variable current (I), voltage (U) and from the resistance value of the coil (Rs) and then the further state variable is compared with a predefined value/course of this further state variable stored in the monitoring module for the movement of the armature disk in the spring-loaded brake. The current value at the point (W) at which the armature disk begins to move is then determined and output.

In a preferred embodiment, the variable derived from the measured state variable is the synchronized moving average of the measured state variable current (I) and voltage (U).

Furthermore, in a preferred embodiment, the further state variable is the inductance (L). In an alternative embodiment, the further state variable is the change in inductance (dL/dt). In a further alternative embodiment, the further state variable is the induced voltage ($U_{ind}$)

In a preferred embodiment, the electromagnetic spring-loaded brake is activated by the control module with a DC voltage. In an alternative embodiment, the electromagnetic spring-loaded brake is activated by the control module with a pulsating DC voltage.

In one embodiment, the value (Y), which defines a limit value for the state of the spring-loaded brake, is 50%-80%. In an alternative embodiment, the value (Y) is 80%-90%. In a further alternative embodiment, the value (Y) is 90%-99%.

The advantage of the invention compared to the prior art is that the degree of wear of the spring-loaded brake can be specified more precisely by the preventive function control than in previously known methods, since due to the formation of a ratio from the two areas, a measure for the remaining reserve of the brake can be specified.

Another advantage when determining the wear by means of the magnetic flux is that it goes into saturation and then does not increase any further while the current value continues to increase and thus the degree of wear can be determined more precisely.

In addition, in continuous operation of a spring-loaded brake, other emerging critical operating states can be recognized, such as the heating of a spring-loaded brake, voltage fluctuations, voltage drops or operation in voltage reduction and the associated changes in the course of the state variables current and voltage.

A further advantage is that a steady flow of information between the spring-loaded brake and an internal or external control of the spring-loaded brake is possible.

Further advantageous details of the invention emerge from the dependent claims and from the description and the drawings mentioned below. It should be noted here that the

DETAILED DESCRIPTION

Figure 1:
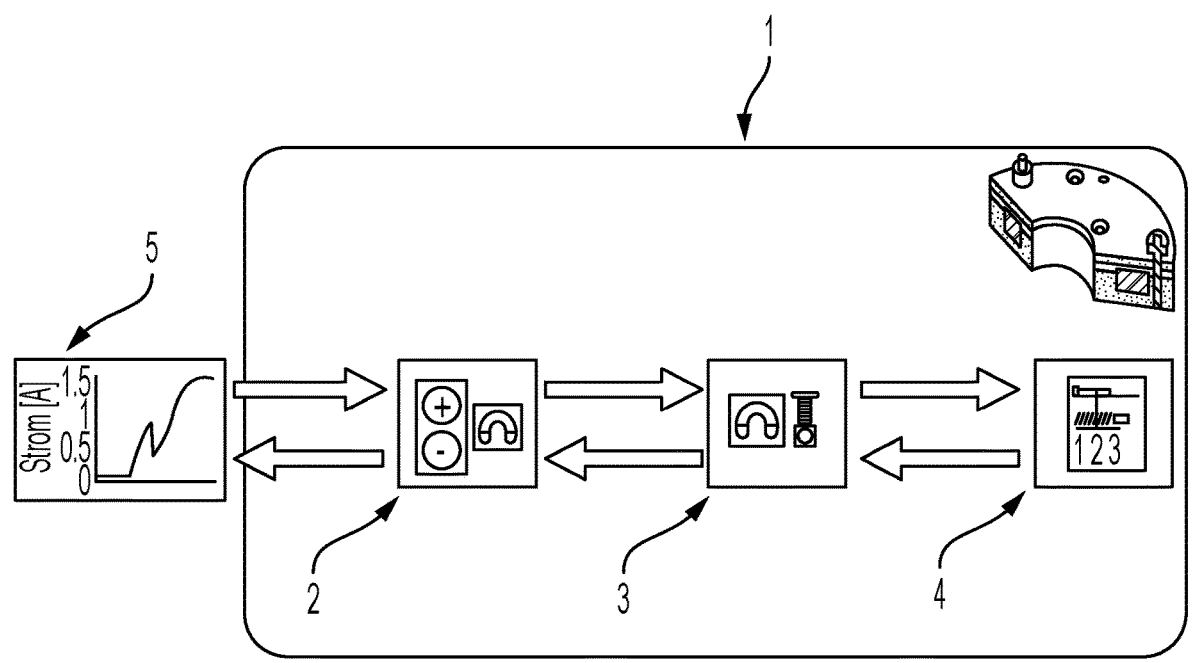
FIG. 1 shows as a block structure the physical conversion processes that take place during the operation of an electromagnetic spring-loaded brake.

In FIG. 1, the at least one electromagnetic spring-loaded brake is shown as a block structure (1), wherein the movement of the armature disk in the spring-loaded brake can be described as a sequence of different physical conversion of energy processes (2, 3, 4). The named physical conversion processes (2, 3, 4) are detailed below and are stored in a monitoring module as a model-based description of the armature disk movement in the spring-loaded brake.

The supplied electrical energy (5) in the form of DC or pulsating DC from an electrical energy source is subjected to several energy conversion processes when the spring-loaded brake is in operation. At the outset, the brake as an electromagnetic actuator can be described as an electromagnetic energy converter (2). The electrical energy experiences a conversion from electrical energy into magnetic energy (3) and concurrently a conversion from potential energy into kinetic energy (4). The conversion of potential energy into kinetic energy takes effect in the electromagnetic actuator through a movement (release) of the armature disk towards the coil carrier. At the same time as the armature disk is released, further energy conversions take place. When the armature disk moves, the kinetic energy is converted into potential energy, this conversion ending when the armature disk has reached the open position. At the same time, a magneto-mechanical energy conversion takes place (3), so that in the last conversion step the originally electrical energy is stored in the mass spring system of the spring-loaded brake. When the brake is closed, i.e. when the armature disk moves from the open to the closed position, the physical conversion processes described take place. These are not free of retroactive effects and are reflected in the model-based description of the armature disk movement. The model-based description includes predefined values that correspond to the movement of the armature disk in the spring-loaded brake.

The model-based description contains the values and the progress of state variables such as current (I) or voltage (U) or variables derived from the state variables such as in particular inductance, change in inductance or the induced voltage. The various predefined values from the model-based description of the armature disk movement in a spring-loaded brake are related to the various operating states of an electromagnetic spring-loaded brake.

Various operating states of a spring-loaded brake are described below. At the beginning of operation or to open an electromagnetic spring-loaded brake, this is switched on, i.e. supplied with a voltage (pulsating DC or DC). As a result of a sufficient voltage supply, the armature disk moves from a closed (applied) position to an open (released) position. The spring-loaded brake is then in an open operating state. At the end of operation or when closing (braking) an electromagnetic spring-loaded brake, the power supply is interrupted, i.e. the spring-loaded brake is not or not sufficiently supplied with a voltage (AC or DC). As a result of a missing or insufficient power supply, the armature disk moves from the open position to the closed position. The spring-loaded brake is then in a closed operating state. Additionally, the spring-loaded brake can include the operating state of partial application, particularly in the case of damped spring-loaded brakes. Here, the armature disk is supplied with a voltage to such an extent that the armature disk slowly moves between the open and closed position within the spring-loaded brake. Depending on the voltage supply, the armature disk moves slowly upwards or downwards.

The model-based description of the movement of the armature disk in relation to the possible operating states of the spring-loaded brake is stored in a monitoring module. The monitoring module comprises at least one semiconductor component, in particular a microprocessor, and at least one current measuring device and/or a voltage measuring device.

By means of a control module, which is connected to the at least one spring-loaded brake and the monitoring module, the spring-loaded brake can be given an operating state and supplied with the voltage corresponding to the operating state.

Figure 2:
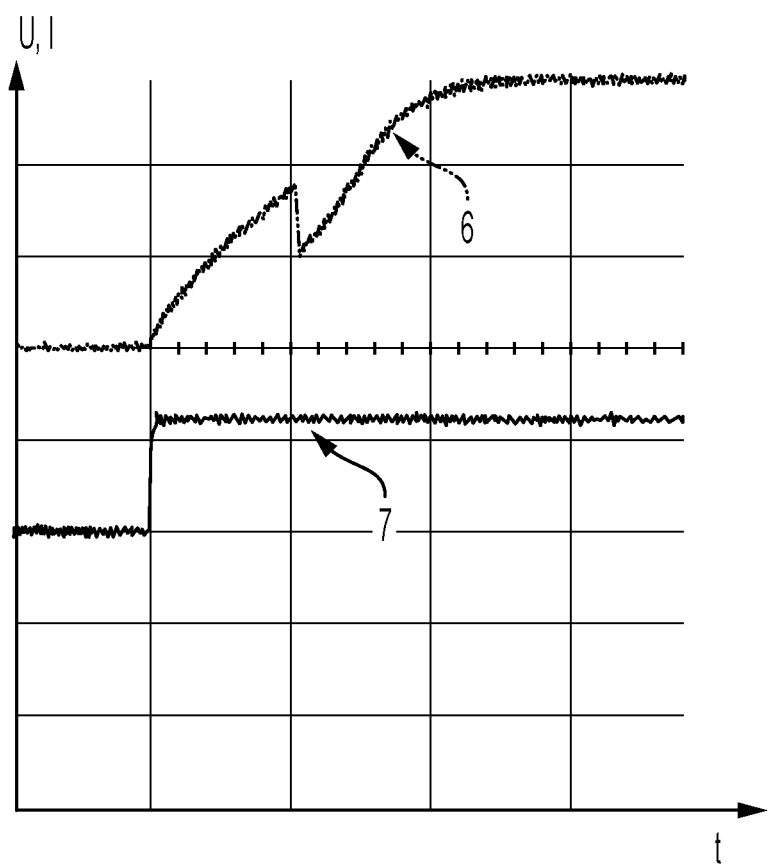
FIG. 2 shows the measured state variables current (I) and voltage (U) upon switching on (releasing) an electromagnetic spring-loaded brake with a DC voltage.

FIG. 2 shows an exemplary current (6) and voltage (7) curve when an electromagnetic spring-loaded brake is switched on with a DC voltage. In this case, the spring-loaded brake is activated with a voltage via a control module and an operating state to be achieved can be specified, in this case an open operating state. As a result of the application of a suitable DC voltage to the at least one spring-loaded brake, the current builds up according to an exponential function. As soon as the above-described physical conversion processes of the electrical energy have progressed so far that the armature disk moves towards the coil carrier, this movement is also reflected in particular in the state variable current (6). As shown in FIG. 2, the movement of the armature disk causes a characteristic drop in the curve of the state variables current (6). Following this characteristic drop, the current rises again during the movement of the armature disk, following the exponential function of the inductive switch-on process, until it reaches a constant current value after the open operating state has been reached.

Figure 3:
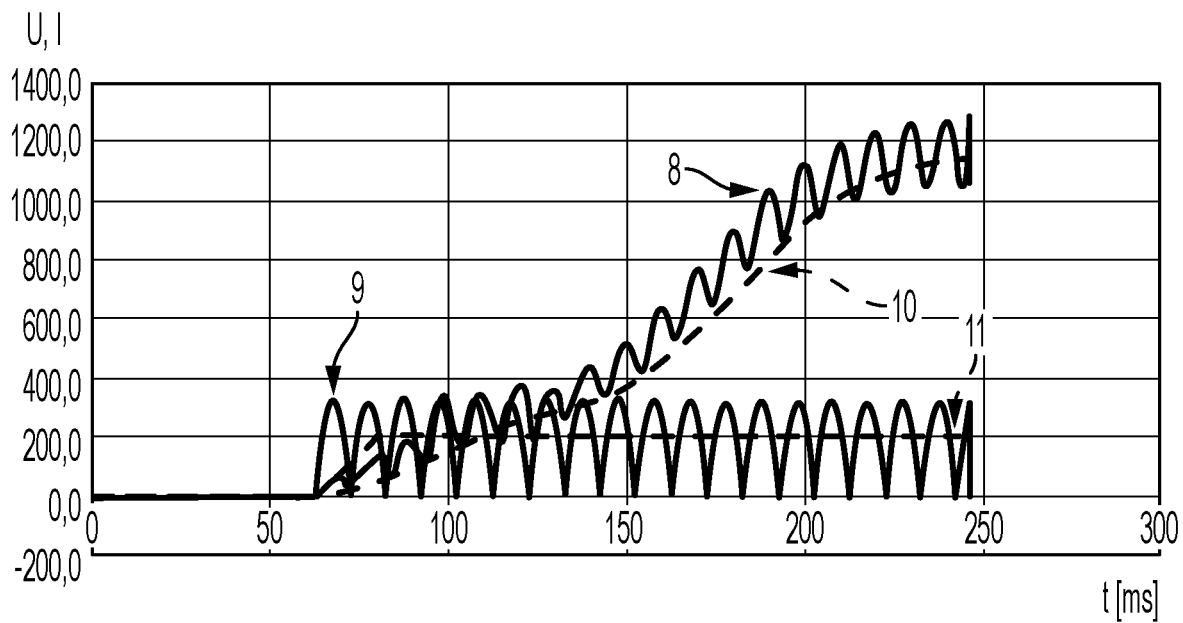
FIG. 3 shows the measured state variables current (I) and voltage (U) upon switching on (releasing) an electromagnetic spring-loaded brake with a pulsating DC voltage.

FIG. 3 shows an exemplary current (8) and voltage (9) curve when an electromagnetic spring-pressure brake is switched on with (mains) AC with a bridge rectifier. Here, the voltage curve (9) shows a pulsating DC voltage and the current curve (8) shows a rising curve, this curve being overlaid by a wave structure. In addition, the synchronized moving average value for the measured state variables current (10) and voltage (11) is shown in FIG. 3 as a derived variable. Synchronized moving average in this context means that the length of the moving average of the measured current and voltage values is set and synchronized to an integer multiple of the half period of the mains frequency of the input voltage that is common on site. In particular, the moving average values are synchronized to the common mains frequencies of 50 Hz or 60 Hz. In addition, equivalent higher-order filtering methods can alternatively be used instead of the synchronized moving average.

Figure 4:
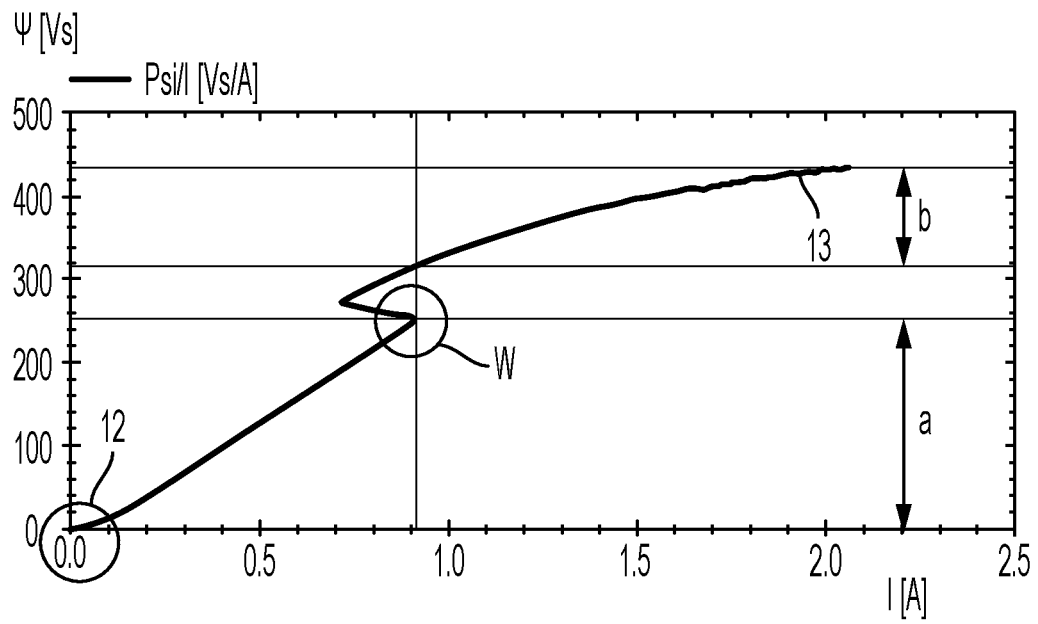
FIG. 4 shows the curve of the linked flux versus the current drop at the spring loaded brake during a switch-on process of an electromagnetic spring-loaded brake.

In FIG. 4, the curve of the linked flux (13) is plotted against the current applied to the brake, specifically for the control (12) of the spring-loaded brake with a DC voltage, as shown in FIG. 2. In this case, the linked flux increases steadily from the starting point of the activation as the current increases. This steady increase in the linked flux with increasing current (I) is maintained up to a point (W) at which the movement of the armature disk within the spring-loaded brake begins. A current value that is measured by the monitoring module can be assigned to this point (W). Following the start of the movement of the armature disk in the electromagnetic spring-loaded brake, the current drops significantly, with the linked flux continuing to increase. In the further course of the movement of the armature disk, the current increases again as the linked flux continues to increase and again reaches the current value measured at point (W). Following this, the linked flux increases steadily together with the current, up to a constant value of the current. The magnetic flux goes into saturation, which means that despite a further increase in the current, the linked flux remains almost constant. The constant current value to be achieved results from the applied voltage and the resistance (Rs) of the coil. In order to determine the functionality of the spring-loaded brake, the parameter linked flux (F) is now summed in an area (a) and an area (b). For area (a), summation is from the starting point of activation to a point (W) at which the armature disk moves. At point (W), the associated current value at which the armature disk begins to move is recorded by the monitoring module.

For area (b), the parameter linked flux is summed, namely from the point of control from which the current value again reaches the current value of point (W) after the movement of the armature disk, up to the point at which a constant current is achieved.

Following the summation of the parameter linked flux over the ranges defined above, a ratio (X) is calculated from the sum of the parameter linked flux in range (a) to the sum of the parameter linked flux over ranges (a) and (b). The ratio (X) provides information about how large the reserve of the linked flux is for operating the brake. Depending on the type of brake used, in particular damped or undamped brake or depending on the brake size, a value (Y) is stored in the monitoring module, with a status signal being issued when this value (Y) is reached or exceeded by the value of the ratio (X). This status signal indicates that the limit value for wear of the brake has been reached or exceeded and/or, if necessary, maintenance or replacement of the spring-loaded brake should be carried out promptly. This method presented here can accordingly also be used for controlling a spring-loaded brake with a pulsating DC voltage.

Figure 5:
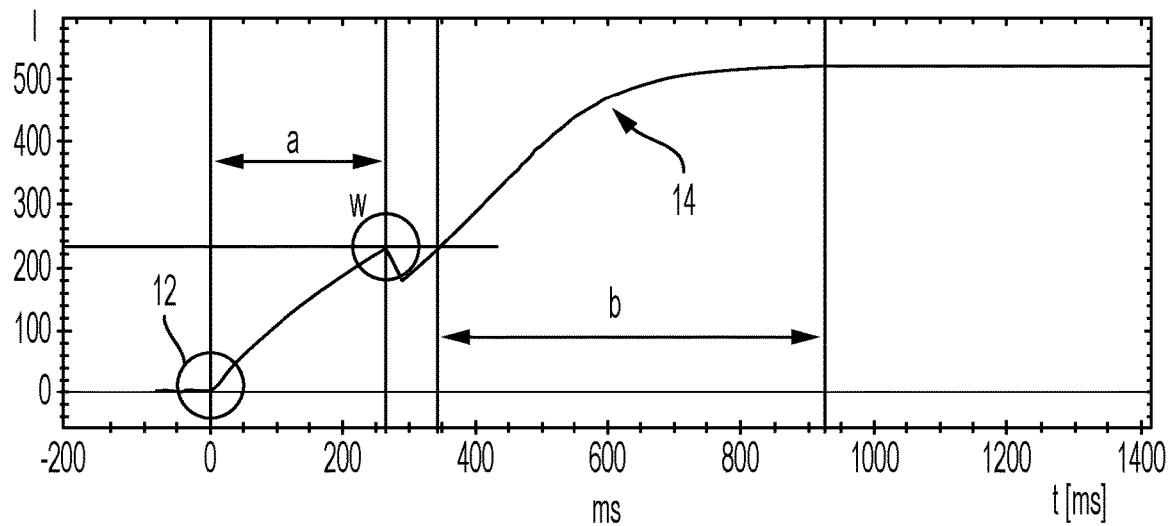
FIG. 5 shows the curve of the current drop across the spring loaded brake versus time during a switch-on process of an electromagnetic spring loaded brake.

In FIG. 5, the curve of the current (14) is plotted against the time when a spring-loaded brake is switched on, specifically for the control of the spring-loaded brake with a DC voltage as shown in FIG. 2. The current (I) increases steadily with increasing time from the starting point of activation. This steady increase in current over time is maintained up to a point (W) at which the armature disk begins to move within the spring-loaded brake. A current value that is measured by the monitoring module can be assigned to this point (W). Following the start of the movement of the armature disk in the electromagnetic spring-loaded brake, the current drops significantly with increasing time. As the armature disk movement continues over time, the current increases again and again reaches the current value determined at point (W). In the further course of time, the current increases steadily, up to a constant current value. The constant current value to be achieved results from the applied voltage and the resistance (Rs) of the coil.

To determine the functionality of the spring-loaded brake, the parameter time (T) is accordingly summed in an area (a) and an area (b). For area (a), summation is from the starting point of activation (12) to the point (W) at which the armature disk moves. The associated current value is recorded at the point (W) at which the armature disk begins to move. For area (b), parameter time is summed from the point of control from which the current value after the armature disk has returned to the current value of point (W) to the point at which a constant current is achieved.

Following the summation of the parameter time over the areas (a) and (b) defined above, a ratio (X) is calculated as the sum of the parameter time in area (a) to the sum of the parameter time over the areas (a) and (b). The ratio (X) provides information about the remaining reserve for releasing the spring-loaded brake. Depending on the type of brake used, in particular damped or undamped brake or depending on the brake group, a value (Y) is stored in the monitoring module, with a status signal being issued when this value (Y) is reached or exceeded by the value of the ratio (X). This state signal indicates that the limit value for the critical operating state of the brake has been reached or exceeded and/or that maintenance or replacement of the spring-loaded brake should be carried out promptly, if necessary. This method presented here can accordingly also be used for controlling a spring-applied brake with a pulsating DC voltage.

Figure 6:
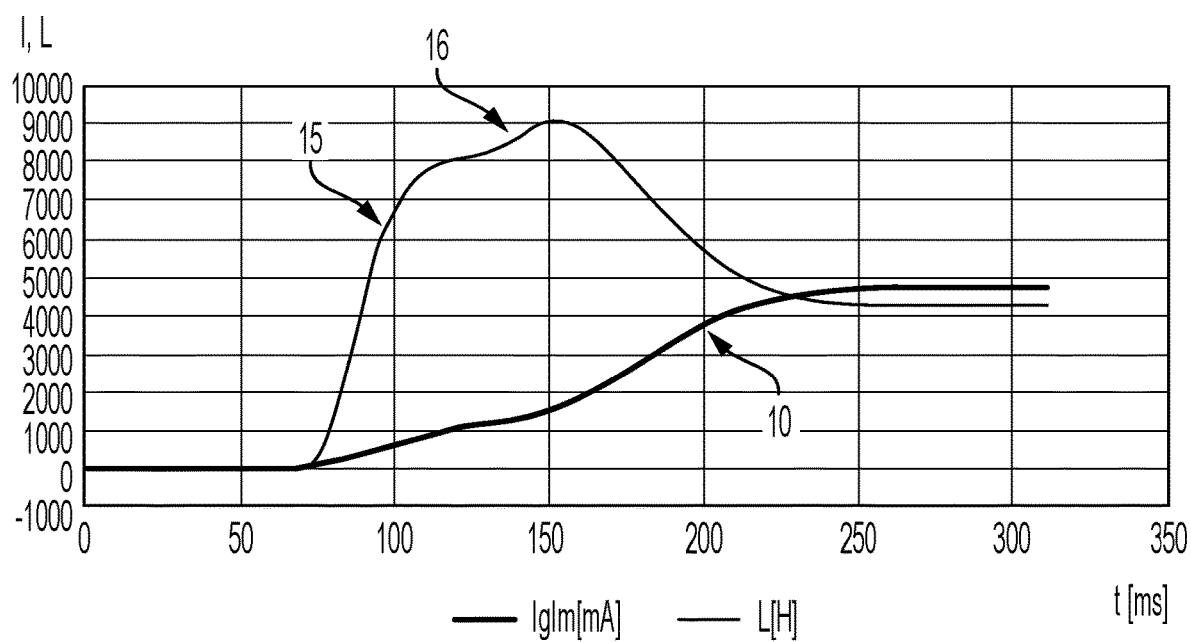
FIG. 6 shows the curve of the inductance during a switch-on process of an electromagnetic spring-pressure brake with a pulsating DC voltage.

In FIG. 6, the curve of the inductance (15) is shown by way of example during a movement of the armature disk during a switch-on process with pulsating DC according to FIG. 3. In a first embodiment, the beginning of the movement of the armature disk can be determined on the basis of the curve of the inductance. The inductance was calculated from the synchronized moving average of current and voltage and from the resistance value (Rs) of the coil.

Immediately after switching on, the inductance (L) initially increases sharply, after which the inductance almost reaches a plateau. During this plateau, the above-described physical conversion processes of the electrical energy progress so far that the movement of the armature disk from the closed to the open state in the course of the inductance can be recognized from the renewed increase in the inductance (16). Following this renewed increase in the inductance, the inductance (15) decreases in the further course to an almost constant value. Preferably, the linked magnetic flux $\Psi = \Sigma\, U_{IND}$ can be determined to calculate the inductance (L). The brake is to be regarded as a series connection of inductance and ohmic resistance, whereby the voltage $U_{IND}$ induced by the applied voltage U, is reduced by the voltage value $U_{RS}$ dropping across the ohmic resistance of the coil, so that the induced voltage is $U_{IND} = U - U_{RS}$. Here, the falling voltage is $U_{RS} = I \cdot R$ where $R_{RS}$ is the resistance value (Rs) of the coil. The inductance L then results from the relationship $L = \Psi/I$. This method presented here can accordingly also be used for controlling a spring-loaded brake with DC. In a further embodiment of the invention, the beginning of the movement of the armature disk can be determined on the basis of the change in inductance (dL/dt).

Figure 7:
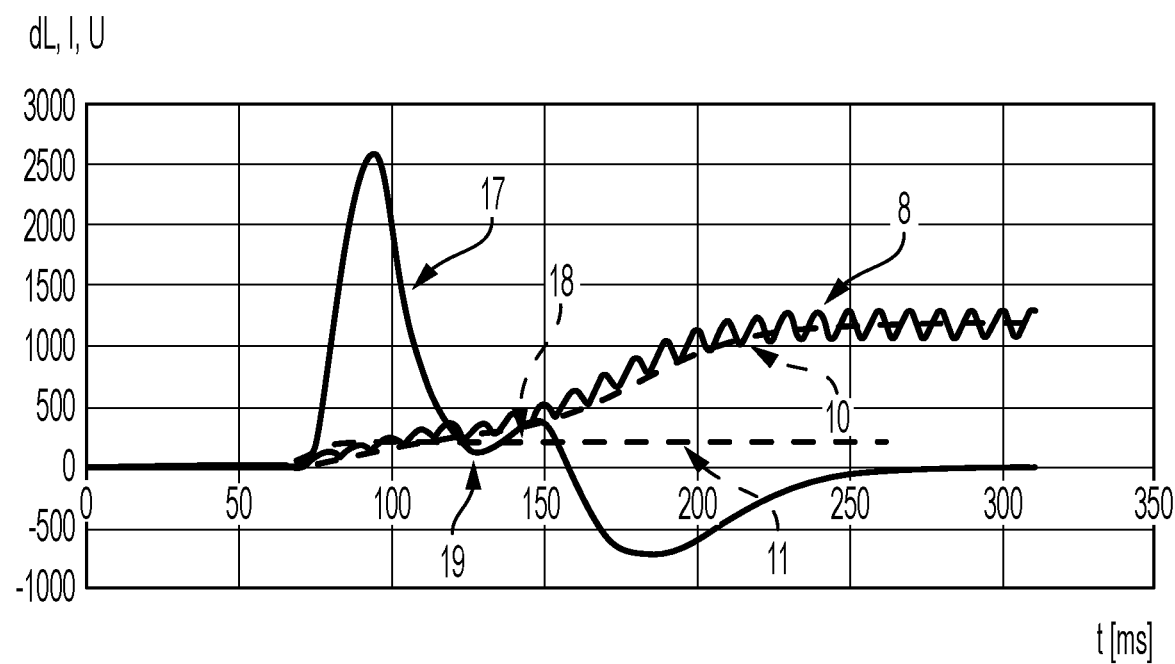
FIG. 7 shows the progress of the change in inductance during a switch-on process of an electromagnetic spring-loaded brake with a pulsating DC voltage.

FIG. 7 shows the change in inductance as a derivative with respect to time (17) from the curve of the inductance from FIG. 6. As a result of the application of the (mains) AC voltage, the change in inductance (dL/dt) increases rapidly to a maximum positive value (global maximum) then decrease again. During this fall, the above-described physical conversion processes of the electrical energy progress so far that the armature disk moves towards the coil carrier. The beginning of the movement of the armature disk is assigned to the turning point (19) in the curve of the change in inductance. This turning point corresponds to point (W) in the curve of FIGS. 4 and 5. A current value can be assigned to this turning point (19), which is used in the method described above in order to be able to carry out a preventive function control of the brake. The movement of the armature disk is reflected in the further course of the change in inductance (dL/dt) (17) through an increase. This local maximum (18) reflects the movement of the armature disk. Subsequently, the change in inductance drops during the movement of the armature disk, in order to remain at a constant value. This method presented here for determining the current value at the beginning of the movement of the armature disk can also be used to control a spring-loaded brake with DC.

LIST OF REFERENCE SYMBOLS

1. Spring-loaded brake as a block structure
2. Electro-magnetic energy converter
3. Magneto-mechanical energy converter
4. Potential and Kinetic Energy
5. Energy source
6. Current curve—DC switch-on
7. Voltage curve—DC—switch on
8. Current curve—pulsating DC—switching on
9. Voltage curve—pulsating DC—switch on
10. Synchronized moving average of current
11. Synchronized moving average voltage
12. Starting point of the control
13. Linked flux
14. Curve of current
15. Curve of inductance
16. Change in inductance when the armature disk moves
17. Curve of the change in inductance over time (dL/dt)
18. Local maximum in the curve of the change in inductance
19. Point of inflection in the curve of the change in inductance I Current
U Voltage
a Area a
b Area b
T parameter time
F parameter linked flux
W Beginning of movement of the armature disk
Rs Resistance of the coil
X Value of the ratio
Y Prescribed value
L Inductance

The invention claimed is:

1. A method for preventive function control of at least one electromagnetic spring-loaded brake, which at least:
   comprises a coil, as well as
   an armature disk;
   a coil carrier with compression springs distributed thereon;
   a control module; and
   a monitoring module with at least:
   a semiconductor component,
   a current measuring device, and
   a voltage measuring device;
   wherein the method includes:
   (i) controlling the spring-loaded brake with a voltage by the control module;
   (ii) measuring state variables current (I) and voltage (U) at the electromagnetic spring-loaded brake by the monitoring module;
   (iii) determining a parameter (T; F) during the control of the electromagnetic spring-loaded brake by the control module;
   (iv) integrating the parameter (T; F) over a first range of the parameter (T; F) which extends from a starting point of the control to a point (W) at which the armature disk begins to move;
   (v) detecting a current value at the point (W) at which the armature disk begins to move;
   (vi) integrating the parameter (T; F) over a second range of the parameter (T; F) which extends from the starting point of the control when the current (I) again reaches the current value at the point (W) to a point at which a constant current is achieved;
   (vii) calculating a ratio (X) from the integral of the parameter (T; F) over the first range to the integral of the parameter over the first and second ranges; and
   (viii) outputting a status signal upon a value of the ratio (X) reaching or exceeding a predetermined value (Y).

2. The method according to claim 1, characterized in that the parameter (T) is time.

3. The method according to claim 1, characterized in that the parameter (F) is the linked flux.

4. The method according to claim 1, characterized in that the electromagnetic spring-loaded brake is controlled by the control module with a DC voltage.

5. The method according to claim 1, characterized in that the electromagnetic spring-loaded brake is controlled by the control module with a pulsating DC voltage.

6. The method according to claim 1, characterized in that the electromagnetic spring-loaded brake is a damped or undamped electromagnetic spring-loaded brake.

7. The method according to claim 1, characterized in that the predetermined value (Y) is 50% to 80%.

8. The method according to claim 1, characterized in that the predetermined value (Y) is 80% to 90%.

9. The method according to claim 1, characterized in that the predetermined value (Y) is 90% to 99%.

10. The method according to claim 1, wherein detecting the current value at the point (W) at which the armature disk begins to move includes:
    calculating a further state variable from the measured state variables current (I) and voltage (U) and from a resistance value of the coil (Rs) or from a variable derived from the measured state variables current (I) and voltage (U) and from the resistance value of the coil (Rs);
    (ii) comparing the further state variable with a predefined value of this further state variable stored in the monitoring module for movement of the armature disk in the spring-loaded brake; and
    (iii) determining and outputting the current value at the point (W) at which the movement of the armature disk begins, characterized in that the variable derived from the measured state variables current (I) and voltage (U) is the filter function of the measured state variable current (I) and voltage (U).

11. The method according to claim 10, characterized in that the further state variable is an inductance (L).

12. The method according to claim 10, characterized in that the further state variable is a change in inductance (dL/dt).

13. The method according to claim 10, characterized in that the further state variable is an induced voltage ($U_{ind}$).

14. The method according to claim 10, wherein the filter function is a synchronized moving average.

* * * * *